United States Patent
Scholl

[11] 3,923,022
[45] Dec. 2, 1975

[54] COMBUSTION ENGINE IGNITION TIMING SYSTEM

[75] Inventor: Hermann Scholl, Korntal, Germany

[73] Assignee: Robert Bosch G.m.b.H., Gerlingen-Schillerhohe, Germany

[22] Filed: Apr. 17, 1974

[21] Appl. No.: 461,527

[30] Foreign Application Priority Data
Apr. 23, 1973 Germany............................ 2326187

[52] U.S. Cl..... 123/117 R; 123/146.5 A; 123/148 E
[51] Int. Cl.² .......................... F02P 1/00; F02P 5/04
[58] Field of Search ...... 123/117 R, 146.5 A, 148 E

[56] References Cited
UNITED STATES PATENTS

| | | | |
|---|---|---|---|
| 3,454,871 | 7/1969 | Nolting............................ | 123/148 E |
| 3,521,611 | 7/1970 | Finch ............................. | 123/148 E |
| 3,592,178 | 7/1971 | Schiff............................. | 123/117 R |
| 3,696,303 | 10/1972 | Hartig ............................ | 123/32 E A |
| 3,708,659 | 1/1973 | Schirmer.......................... | 235/197 |
| 3,738,339 | 6/1973 | Huntzinger .................. | 123/146.5 A |
| 3,749,073 | 7/1973 | Asplund...................... | 123/146.5 A |
| 3,752,139 | 8/1973 | Asplund...................... | 123/146.5 A |
| 3,756,212 | 9/1973 | Schirmer et al.................. | 123/148 E |
| 3,757,755 | 9/1973 | Carner............................ | 123/32 EA |
| 3,759,232 | 9/1973 | Wahl et al...................... | 123/32 EA |
| 3,785,356 | 1/1974 | Niemdeller...................... | 123/148 E |
| 3,809,029 | 5/1974 | Wakamatsu et al. ........... | 123/117 R |
| 3,853,103 | 12/1974 | Wahl et al....................... | 123/117 R |
| 3,867,916 | 2/1975 | Bigalke .......................... | 123/117 R |

Primary Examiner—Charles J. Myhre
Assistant Examiner—Paul Devinsky
Attorney, Agent, or Firm—Flynn and Frishauf

[57] ABSTRACT

To accurately control the instant of ignition in internal combustion engines, a rapidly following sequence of pulses are generated, as the engine rotates; further, a single pulse is generated at a predetermined angular position of the engine crankshaft, which triggers an accumulator to count the number of pulses after that trigger pulse, and derive an analog, value representative, at any instant of time, of the angular position of the crankshaft. When this value is equal to a command value, a trigger pulse is generated which triggers the ignition system. The accumulator may be an integrator which integrates an analog voltage. The trigger circuit then may include a comparator to which a voltage is applied representative of at least one parameter of operation of the engine so that the ignition timing can be varied in dependence on this parameter.

4 Claims, 3 Drawing Figures

COMBUSTION ENGINE IGNITION TIMING SYSTEM

The present invention relates to a timing system for the ignition of internal combustion engines, and more particularly to an electronic system to electronically control, accurately, the ignition instant, in which a position transducer is provided which senses the angular position of the crankshaft of the engine, and provides electrical signals, to permit accurate timing of the ignition instant with respect to the angular position of the crankshaft.

Various analog and digital circuit solutions have been proposed to electronically control the ignition instant of the ignition circuits of internal combustion engines. In one arrangement, a monostable flip-flop is triggered by a signal derived from a transducer connected to the crankshaft of the internal combustion engine. The duration of the unstable state of the monostable flip-flop (FF) determines the ignition instant of the ignition system. By changing the timing circuit parameters of the monostable FF, various operating parameters of the internal combustion engine can be considered to change the ignition timing. Such an arrangement has the disadvantage that, if the speed of the internal combustion engine changes greatly, for example in a ratio of 1 : 10, accurate control of adjustment of ignition timing is difficult and can be obtained only with a fair amount of circuit components. Digital control to change the ignition timing has, heretofore, required a substantial number of circuit components for the control circuitry.

With respect to the components used, reference may be had to the book "Automotive Electronics," published jointly by the Institute of Electrical and Electronic Engineers, IEEE, Vehicular Technology Group and the Society of Automotive Engineers (copyright 1973). Circuits and components are described in detail in chapter 740012, "Linear monolithic circuit technics."

It is an object of the present invention to accurately control the ignition instant of internal combustion engines, and in which correction, that is, timing adjustment, of the ignition instant can be easily carried out. The device should, further, be reliable, operate in wide ranges of speed of the internal combustion engine, and be inexpensive and simple. Additionally, the circuit should be so arranged that tolerances in electrical circuit components introduce few, if any, inaccuracies with respect to change of ignition timing.

SUBJECT MATTER OF THE PRESENT INVENTION

Briefly, for each rotation of the crankshaft of the engine, a plurality of electrical pulses are produced from a pulse source. At a predetermined angular position of the crankshaft, a gate is opened. The subsequent pulses are applied to an accumulator which then will, in time, accumulate values representative of the instaneous angular position of the crankshaft. A control voltage generator is provided which, in dependence on at least one operating parameter of the engine, provides a reference or command value for the angular position of the crankshaft when ignition should occur. A comparator compares the output from the command voltage generator with the instantaneously accumulated value representative of angular crankshaft position. Upon sensing of equality, ignition is triggered.

The invention will be described by way of example with reference to the accompanying drawings, wherein.

Figure 1:
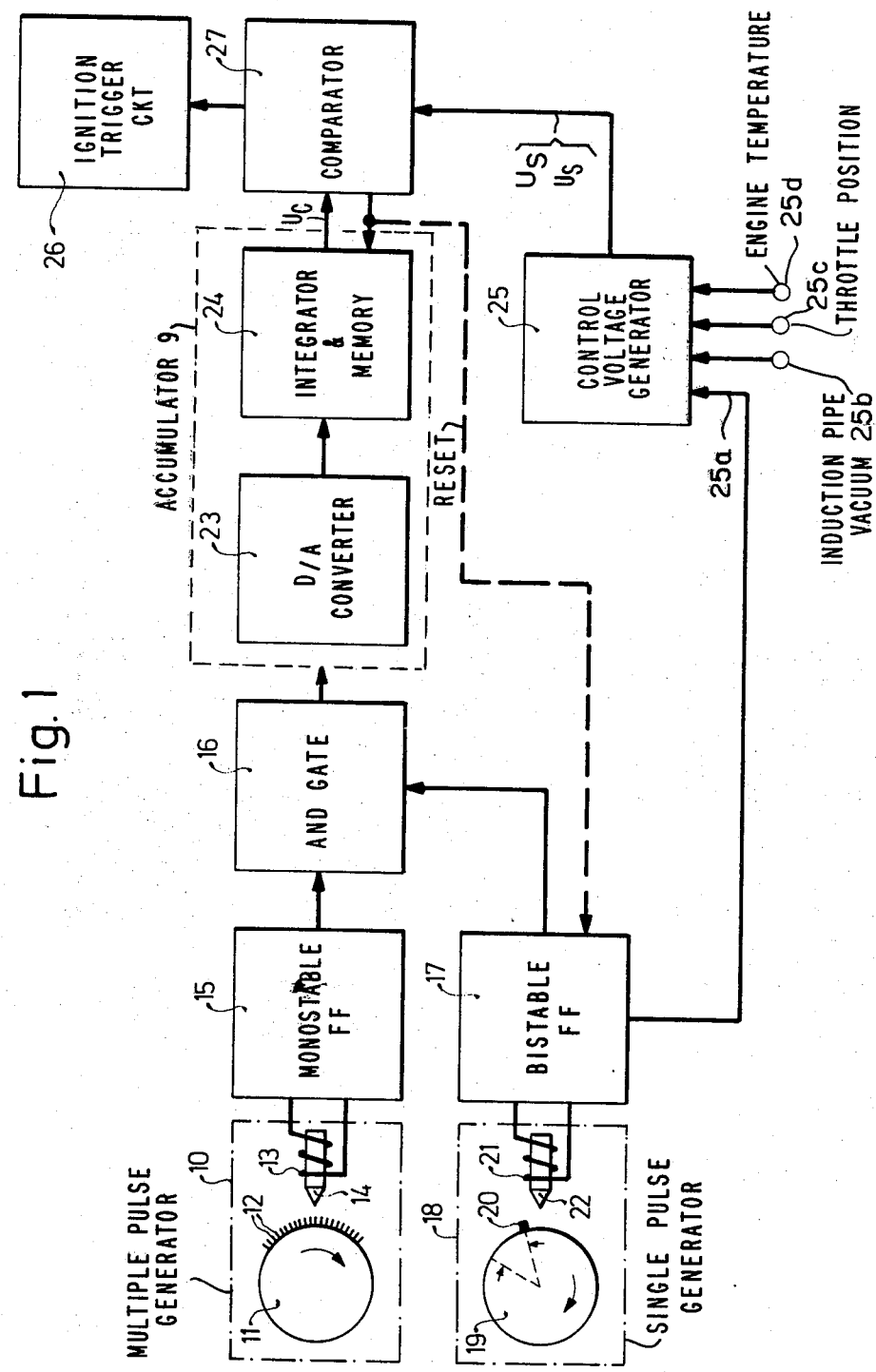
FIG. 1 is a schematic block diagram of the ignition control system in accordance with the present invention.

A pulse source 10 provides a large number of pulses for reach revolution of the crankshaft of the internal combustion engine (not shown). The pulse source 10 includes a star disk 11 which has a large number of conductive or magnetically responsive elements 12 located at the circumference thereof. These elements 12 at the circumference of disk 11 may be placed at a spacing of 0.5° of crankshaft revolution. A coil 13 is located on a core 14, and positioned to have pulses induced therein upon passage of any one of the elements 12 adjacent the core 14. Other arrangements may be used, such as yokes spanning two or more elements 12. Any transducer system 10, which provides multiple pulses upon rotation of the crankshaft 11 may be used. The pulse generator 10 is connected to a monostable FF 15. Upon each pulse, monostable FF 15 is triggered from stable into unstable state, so that the pulses provided by the monostable FF at its output will always have the same pulse width. The pulses from monostable FF 15 are connected to a gate 16 which, in its simplest form, is an AND-gate. The second input to the AND-gate is provided from a bistable FF 17 which is triggered into conductive condition, to open the AND-gate 16 when the crankshaft has a certain angular position.

Bistable FF 17 is controlled from a single pulse generator 18. Single pulse generator 18 includes a disk 19, coupled to rotate synchronously with disk 11, and having at least one element 20 at the circumference thereof which cooperates with a coil 21 wound on an iron core 22, to induce a single signal therein upon passage of element 20 past core 22. The physical arrangement of the transducer 18 may be similar to that of the transducer 10, except that transducer 18 has only a single peripheral element thereon. Element 20 is located at a predetermined angular position with respect to the crankshaft of the engine. Coupling of the disks 11 and 19, therefore, provides an unambiguous allocation of pulses induced in coil 13 after a pulse has been induced in coil 21, to change the state of the bistable FF 17, and thus to allocate a predetermined number of pulses from pulse generator 10 to any angular position of the crankshaft connected to the disks 11, 19 after the pulse is received from coil 21. If, therefore, at a predetermined angular position, for example indicated by the angle $\beta$ with respect to upper dead center position of a piston of the engine, a pulse is induced in coil 21, bistable FF 17 will change state in such a direction that AND-gate 16 is opened. Pulses from monostable FF 15 are, then, passed through the AND-gate 16, and connected to the subsequent circuit which is an accumulator 9. Accumulator 9 may be a counter, counting the number of pulses from monostable FF 15; it may, also, be an analog device as shown in detail in FIG. 1, and then includes a digital/analog (D/A) converter or signal generator responsive to the number of pulses derived from monostable FF 15 and providing a constantly varying output signal, which is applied to an integrator and storage device 24. Storage device 24, in its simplest form, is a capacitor, forming a capacitative memory. With respect to the integrater and storage device 24, reference is made to U.S. Pat. No. 3,759,232 where such a device is shown in detail in FIG. 3 and explained more fully within the reference. The signal applied thereto will cause, across a capacitor in integrator 24, a voltage $u_c(t)$ to appear thereat, varying with respect to angular position of the crankshaft. The rise in voltage is independent of the speed of the engine, since each increment in voltage, being integrated, is derived from the equal pulses of the monostable FF, each pulse being representative of a rotational increment of the angular position of the crankshaft.

The timing of the ignition instant, itself, is commanded from a control voltage generator 25. With respect to function generator 25, reference is made to U.S. Pat. No. 3,708,659. Control voltage generator 25 provides an output voltage $U_s$ which depends on various operating parameters of the internal combustion engine. These parameters are introduced to the control voltage generator at various input terminals. An input terminal 25a, connected to bistable FF 17, is a start terminal to provide the control voltage $U_s$ and may, also, function as a speed signal input terminal. Various other parameters can be applied, such as induction pipe vacuum 25b, position of the control throttle of the engine at terminal 25c, engine temperature at terminal 25d, and other parameters, at suitable similar terminals (not shown). The output from control voltage generator 25, after suitably weighing the various input signals, and applying these signals, if necessary, in accordance with engine operating characteristic functions, provides an output signal which functions as the command value for the ignition instant. When the output voltage $u_c(t)$ from accumulator 9 is equal to the command voltage $U_s$, a comparator 27 is triggered to provide an output pulse to an ignition trigger circuit 26 which, in turn, provides a high voltage pulse to a spark plug. The comparator 27 may, in its simplest form, be merely a Schmitt trigger which has a variable voltage threshold which is controlled by the command voltage $U_s$ derived from control voltage generator 25. When this command voltage, controlling the switching threshold of comparator 27 reaches a value equal to the voltage applied by the accumulator 9, the Schmitt trigger changes state, thus providing a pulse to ignition trigger circuit 26.

Figure 2:
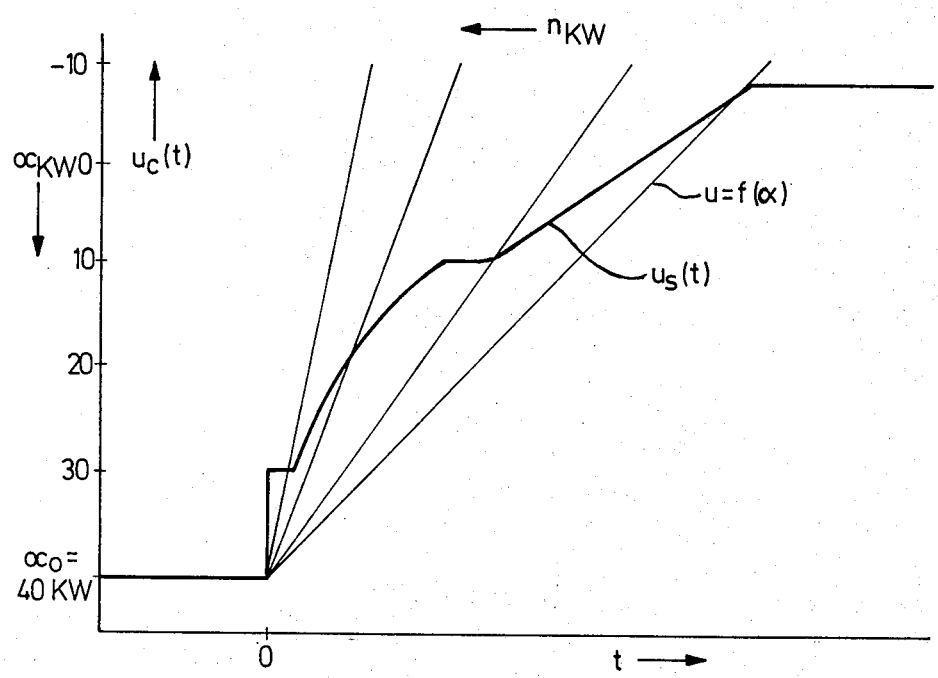
FIG. 2 shows a graph of angular crankshaft position, with respect to time.

Control voltage generators of the type described, in which a plurality of engine operating parameters can be considered, weighed, possibly wave-shaped or changed by means of function generators (for example including different diode-resistor networks) are comparatively expensive. The control voltage generator may be constructed in simpler manner, and may, therefore, merely control a temporally varying control voltage $u_s$ which is a function of the speed of the internal combustion engine, and otherwise has characteristics simulating various operating characteristics of the internal combustion engine, as a variation of speed. FIG. 2 shows — with respect to time — the angular position $\alpha_{KW}$ of the crankshaft of the internal combustion engine, and the stored or integrated voltages $u_c$ for various speeds $n_{KW}$ of the crankshaft.

Figure 3:
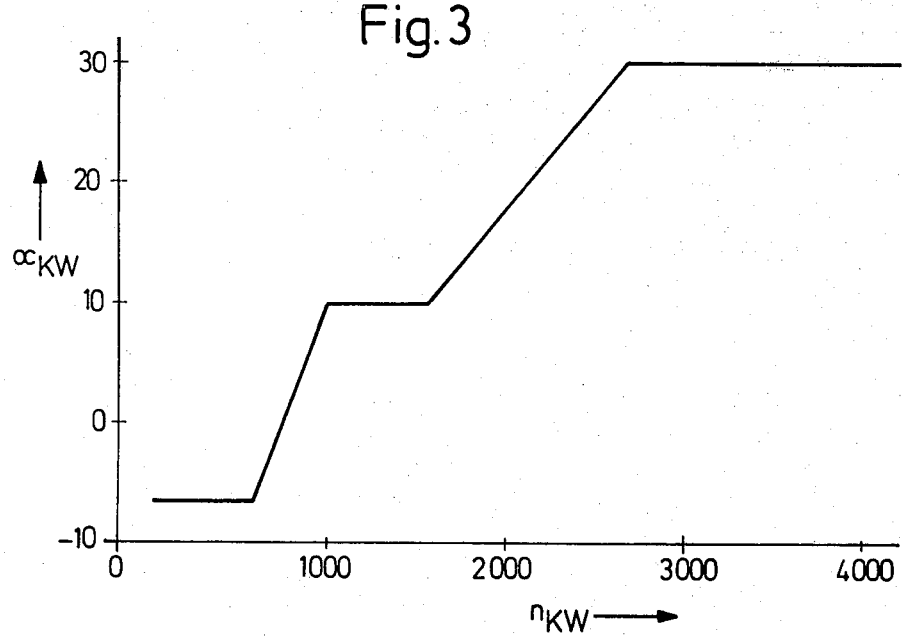
FIG. 3 is a graph of angular crankshaft position with respect to speed of the crankshaft, at which ignition should be commanded.

These curves are straight lines, and since they are functions of the angle $\alpha$, they are indicated as a family $u = f(\alpha)$. The control voltage, as it varies with respect to time, is indicated at $u_s(t)$. the intersection of the command voltage curve ($u_s$) with the accumulated voltage curve ($u$), which may also be termed the stored voltage ($u_c$) then causes firing of the ignition trigger circuit 26, at the angular crankshaft position indicated on the ordinate of FIG. 2. The control voltage which must be generated by control voltage generator 25 in order to have the output voltage $u_s$ of FIG. 2, is indicated in the diagram of FIG. 3, in which the timing of the ignition instant, that is, the angular position of the crankshaft at ignition, is shown with respect to speed of the crankshaft. The ignition adjustment characteristic of FIG. 3, the shape of which will depend on the design and construction of the internal combustion engine, can be generated by a function generator generating a curve of the shown characteristic, as a function of speed. Upon equality of command voltage $u_s$, $U_s$, respectively, generated by the control voltage generator 25 with the output voltage $u_c$ from the integrator and memory 24 of the accumulator 9, the desired ignition timing instant, for any speed, can be obtained.

The control voltage generator 25 is connected to the bistable FF 17 in order to generate the specific time-dependent output signal from the control voltage generator within the tme period of one crankshaft revolution, as determined by one revolution of disk 19 of single pulse generator 18. Upon reset of the control voltage generator, the comparator 27 also provides a reset signal to the integrator 24, and a reset signal to the bistable FF 17, that the integrator 24 can start to integrate anew when the bistable FF 17 again changes to a state opening gate 16. During discharge of the integrator 24, that is, during reset of the accumulator 9, AND-gate 16 is blocked.

Various changes and modifications may be made within the scope of the inventive concept.

I claim:

1. Ignition timing control system for internal combustion engines, comprising:
    shaft position transducer means (18) providing a position signal representative of a predetermined angular position of the crankshaft of the engine;
    pulse transducer means (10) providing a train of sequential signals upon rotation of the shaft;
    a wave-shaping circuit (15) triggered by the pulse transducer means (10) and providing sequential similar pulses;
    a gate (16) energized by the position signal connected to pass the sequential signals upon energization by the position signal;
    an accumulator (9) having a pulse conversion stage (23) providing an output voltage representative of the number of pulses after energization of the gate (16), and
    an integrator and memory stage (24) storing the instantaneous accumulated voltage representative of the instantaneous angle of rotation of the crankshaft after energization of the gate (16) to provide a progressively increasing output voltage representative, at any instant of time, of the instantaneous position of the shaft after occurrence of said position signal;
    a control voltage generator (25) connected to the position transducer means (18) and, upon being triggered by said position signal, generating a time-varying command voltage having a nonlinear time-voltage relationship, and depending on at least one operating parameter of the engine, representative of a commanded ignition instant with respect to said predetermined angular crankshaft position;

and a comparator (27) comparing the output voltage of the control voltage generator (25) and of the accumulated votage of the accumulator (9) and providing an output indicative of the ignition instant, as commanded by the control voltage generator (25) upon rotation of the crankshaft to the commanded position, as represented by the accumulated signal.

2. System according to claim 1, further comprising a bistable switch (17) connected to the position transducer means (18) and changing state when the angular position signal, representative of a predetermined crankshaft position, is applied thereto; said bistable switch providing an output signal to the gate (16) to enable the gate to pass the sequential signals from the pulse transducer means (10).

3. System according to claim 2, further, wherein the wave-shaping circuit is a monostable flip-flop (FF) (15) triggered by the pulse transducer means (10) and providing sequential similar pulses to the gate (16), said sequential similar pulses being passed by the gate (16) when enabled by the bistable switch (17).

4. System according to claim 1, wherein the control voltage generator (25) is a function generator providing an output voltage which is a function of at least one operating parameter of the engine, with respect to time.

\* \* \* \* \*